United States Patent [19]
Graham

[11] Patent Number: 5,945,359
[45] Date of Patent: Aug. 31, 1999

[54] WEFT INSERTED WARP KNIT AIR BAG FABRIC

[75] Inventor: George M. Graham, Moore, S.C.

[73] Assignee: Milliken & Company, Spartanburg, S.C.

[21] Appl. No.: 08/916,916

[22] Filed: Aug. 18, 1997

[51] Int. Cl.[6] .................................................. B60R 21/16
[52] U.S. Cl. ......................... 442/314; 442/318; 428/36.1
[58] Field of Search ........................... 428/36.1; 442/314, 442/318

[56] References Cited

U.S. PATENT DOCUMENTS

| 4,183,993 | 1/1980 | Benstead et al. ........................ 428/253 |
|---|---|---|
| 4,497,863 | 2/1985 | Cogan, Jr. .................................. 428/253 |
| 4,535,015 | 8/1985 | Bruner et al. .............................. 428/44 |
| 4,615,934 | 10/1986 | Ellison ..................................... 428/254 |
| 5,073,418 | 12/1991 | Thornton et al. ....................... 428/34.9 |
| 5,131,434 | 7/1992 | Krummheuer et al. . |
| 5,489,119 | 2/1996 | Prescaro et al. ...................... 280/743.2 |
| 5,692,777 | 12/1997 | Tochacek et al. .................... 280/743.1 |

*Primary Examiner*—Deborah Jones
*Assistant Examiner*—Jason Savage
*Attorney, Agent, or Firm*—Terry T. Moyer; Earle R. Marden

[57] ABSTRACT

A new and improved air bag using a weft inserted warp knit fabric laminated to a film as the inflatable member of the air bag when the inflator device is engaged to supply gas into the interior of the bag.

8 Claims, 4 Drawing Sheets

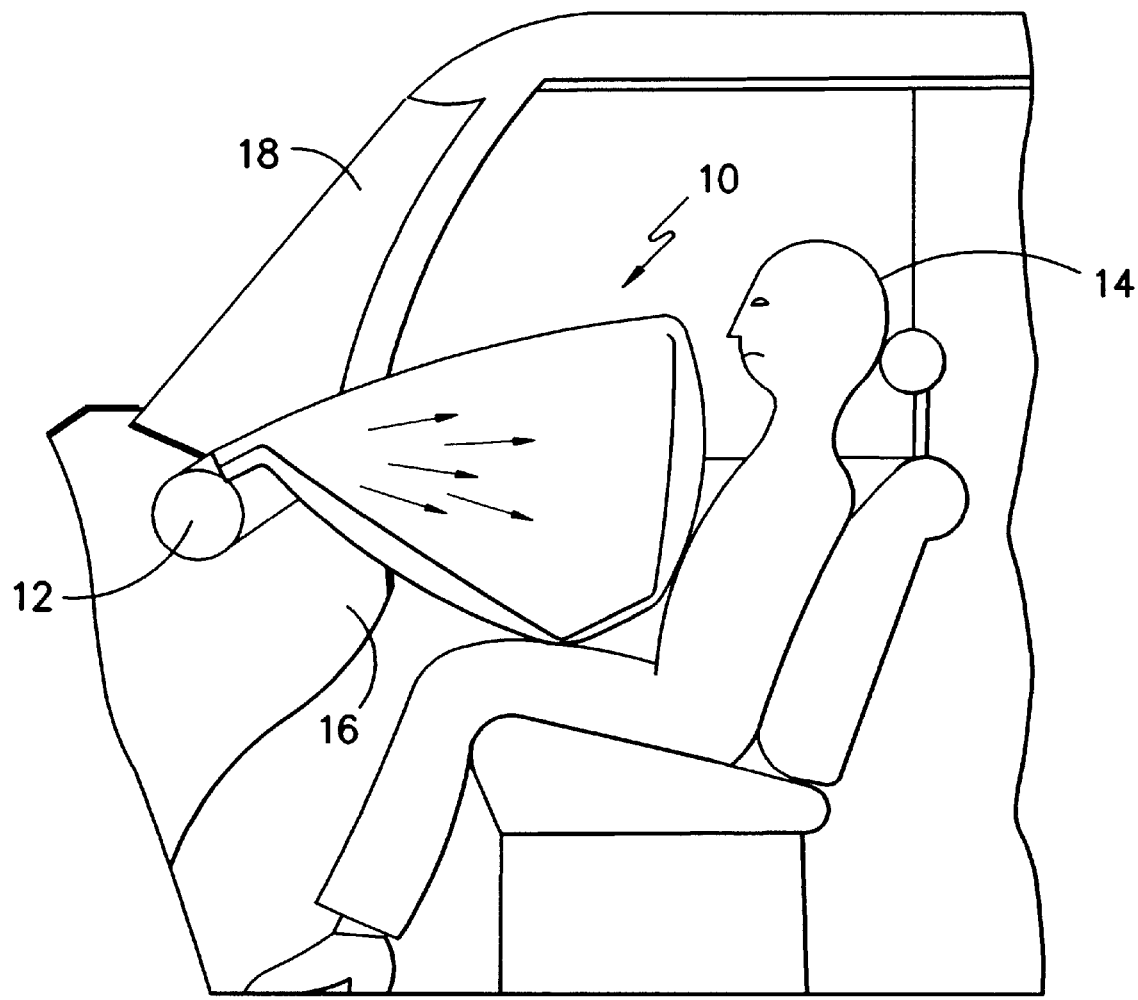
FIG. -1-

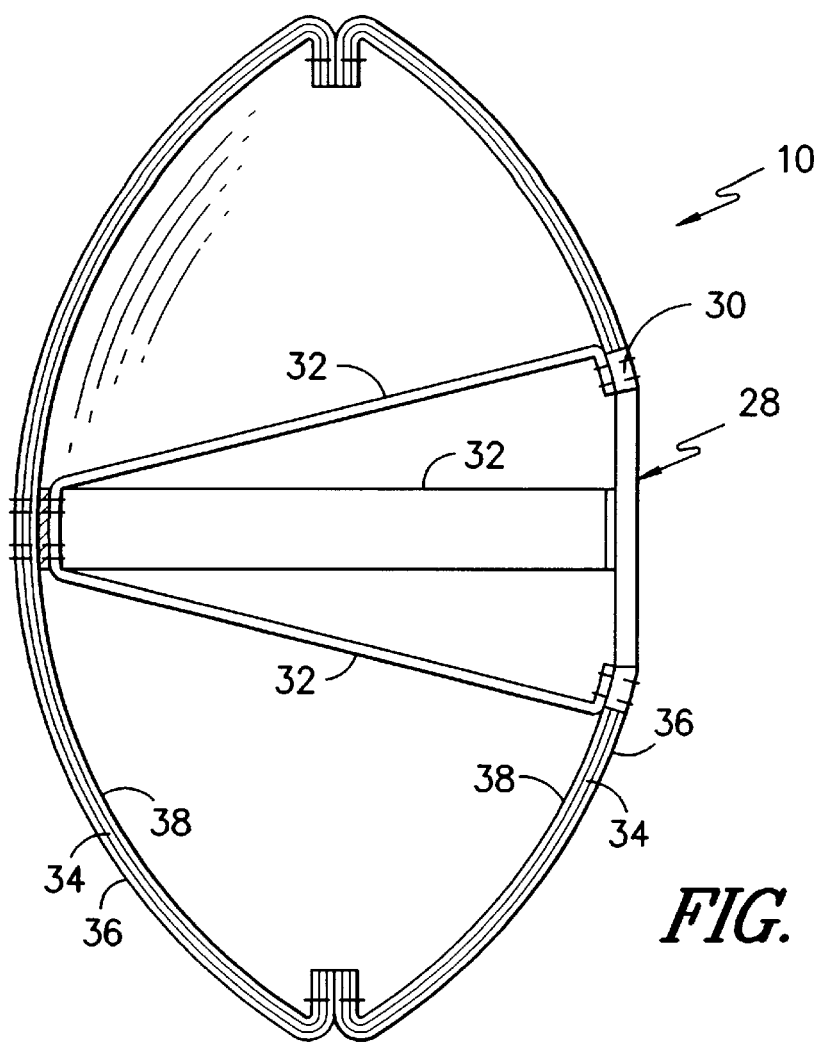
FIG. -2-
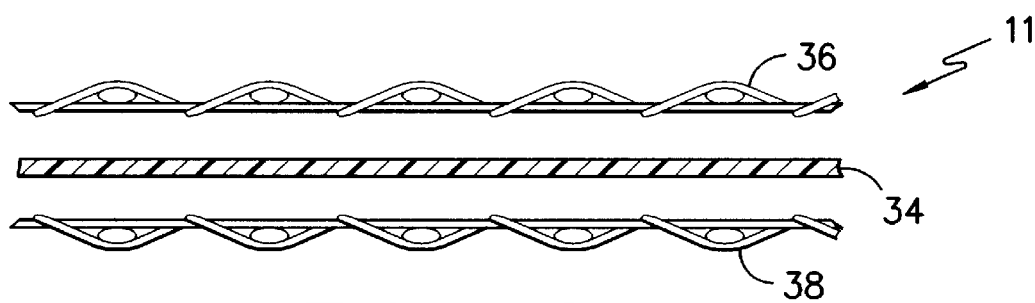
FIG. -3-
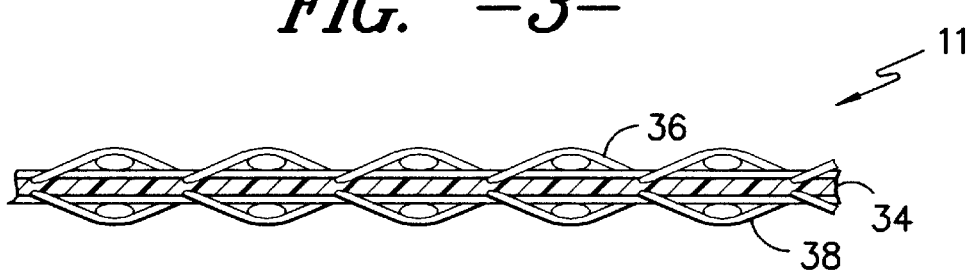
FIG. -4-

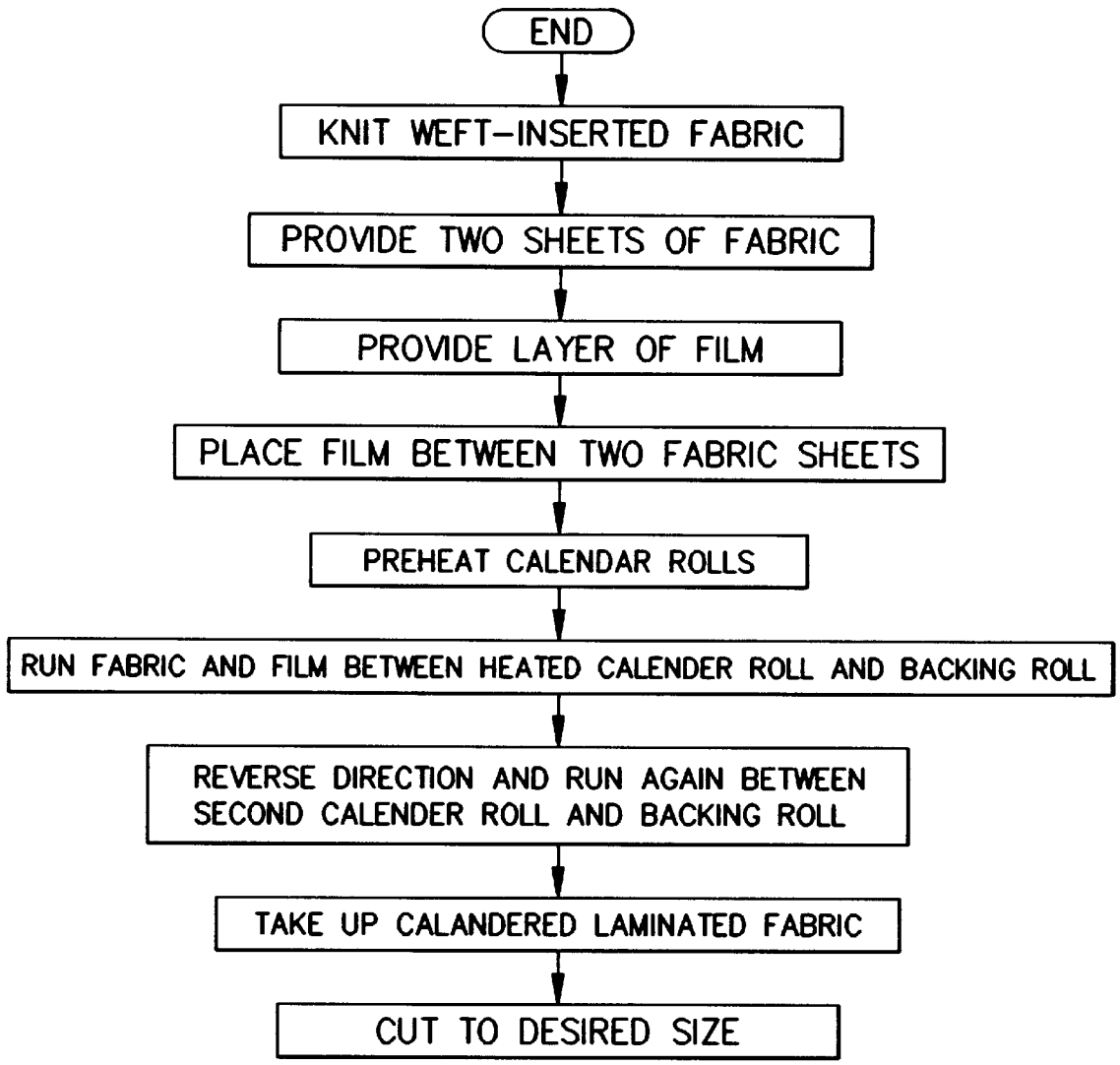
FIG. -5-
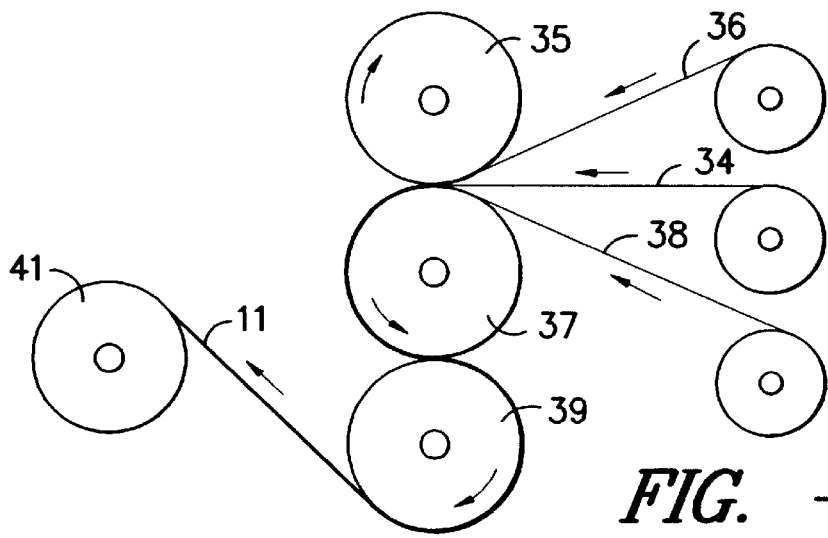
FIG. -6-

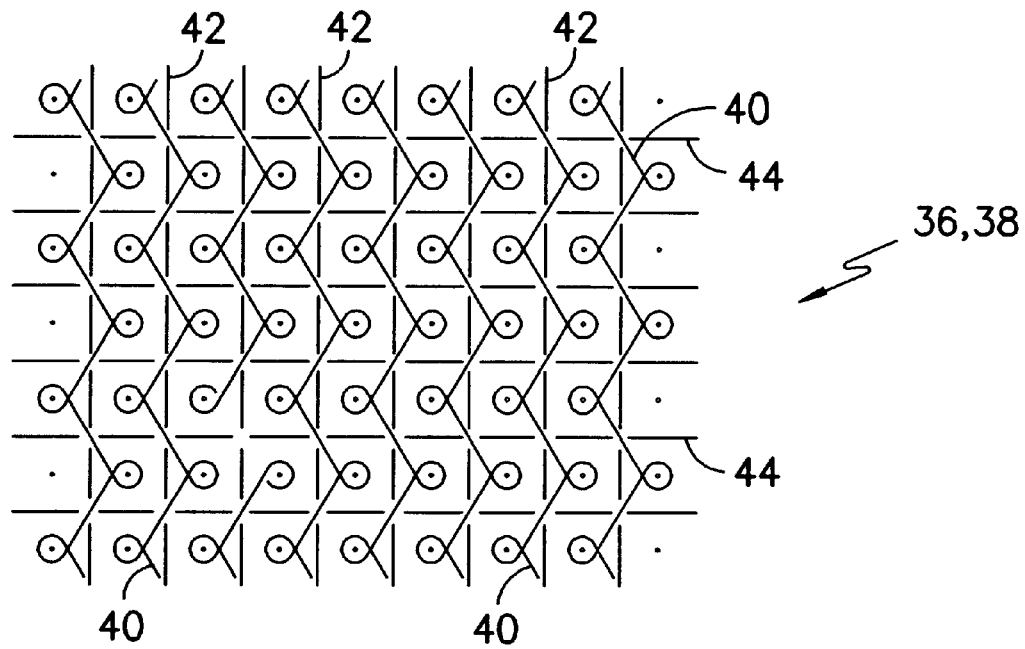
FIG. -7-
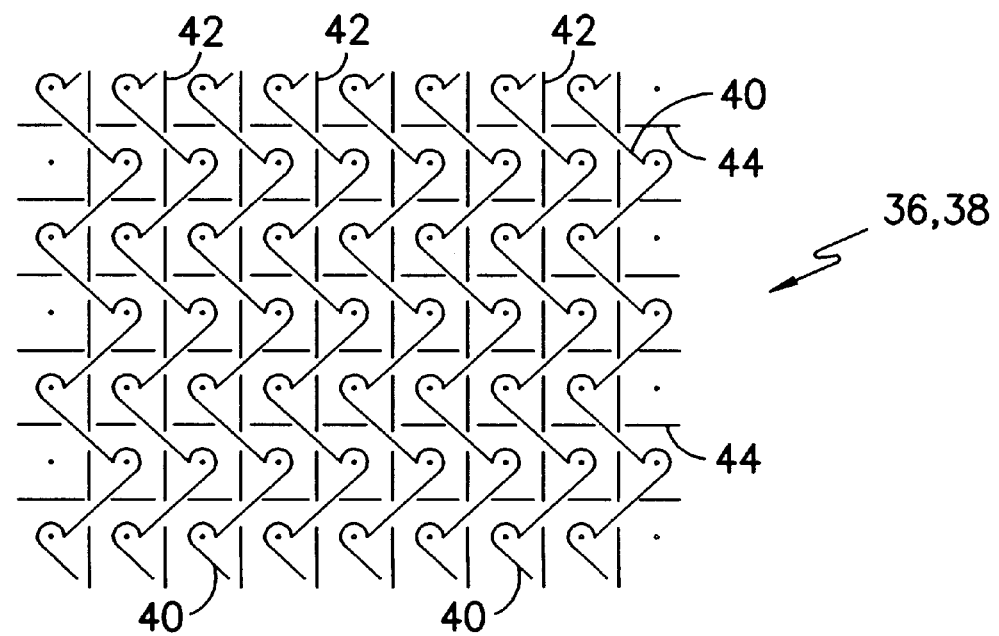
FIG. -8-

WEFT INSERTED WARP KNIT AIR BAG FABRIC

This invention relates to a laminated warp knit fabric for use in an air bag and in particular to a weft inserted warp knit fabric for air bags to provide balanced stretch and increased strength versus a comparable fabric.

An inflatable cushion disposed within a supporting structure such as a dash panel, side door or other fixed portion of a car body in opposing relation to a seat in the vehicle plays an important role in protecting the occupants in a vehicle from injury due to collision against the car body. Typically, the inflatable cushion is inflated rapidly by the pressure of a reaction gas released from an inflator during a collision. This gas generation typically takes place when a gas generating agent in the inflator induces a chemical reaction by a collision signal from a collision detecting sensor when the deceleration of the vehicle exceeds a certain level. The gas which is generated by the generator is then conveyed to the inflatable cushion which expands outwardly as it fills with gas to create a protective barrier between the vehicle occupant and the dash panel or other portion of the vehicle body against which the occupant might otherwise be thrown.

Inflatable cushion systems commonly referred to as air bag systems have been used in the past to protect both the operator of the vehicle and passengers. Systems for the protection of the vehicle operator have typically been mounted in the steering column of the vehicle and have utilized cushion constructions directly deployable towards the driver. These driver-side cushions are typically of a relatively simple configuration in that they function over a fairly small, well-defined area between the driver and the steering column.

Inflatable cushions for use in the protection of passengers against frontal or side impacts must generally have a more complex configuration since the position of a vehicle passenger may not be well defined and greater distance may exists between the passenger and the surface of the vehicle against which that passenger might be thrown in the event of a collision. Some cushions which might be used in such environments are disclosed in U.S. Pat. No. 5,316,337 to Yamaji et al. issued May 31, 1994; U.S. Pat. No. 5,310,216 to Wehner et al. issued on May 10, 1994; U.S. Pat. No. 5,090,729 to Watanabe issued Feb. 25, 1992; U.S. Pat. No. 5,087,071 to Wallner et al. issued Feb. 11, 1992; U.S. Pat. No. 4,944,529 to Backhaus issued Jul. 31, 1990; and U.S. Pat. No. 3,792,873 to Buchner et al. issued Feb. 19, 1974, all of which are incorporated herein by reference.

It is therefore an object of the invention to provide an air bag fabric which will perform in an inflatable cushion or air bag to protect the occupant of an automobile upon an accident by efficiently inflating to prevent the occupant from injury and which is described herein with reference to the accompanying drawings in which:

FIG. 1 shows a cut-away view of the inflatable cushion incorporating the present invention in deployment between a passenger and a dash panel;

FIG. 2 is a schematic sectional view of a typical air bag inflated which can use the herein disclosed novel air bag fabric;

FIGS. 3 and 4 are cross-section views of the new and novel fabric;

FIG. 5 is a flow diagram of the general process to make the fabric of FIG. 4;

FIG. 6 is a schematic representation of the lamination process; and

FIGS. 7 and 8 are the warp knit fabrics which can be employed in the construction of the fabric shown in FIG. 4.

Turning now to the drawings, wherein like elements are denoted by like reference numerals in the various views, in FIG. 1 there is shown an inflatable restraint 10 for use with an inflator 12 to protect a vehicle occupant 14 from impacting against a dash panel 16, windshield 18 or other interior surface in the event of a collision. As will be noted, the configuration of the inflatable restraint as illustrated is intended to provide sufficient depth of coverage so as to provide a degree of protection to the vehicle occupant 14 in a number of orientations. In particular, the inflatable restraint is configured to have a generally deep arcuate profile so as to provide good overall coverage.

The present invention encompasses not only the strong, lightweight, thin, flexible fabric 11 of low permeability described hereinabove, but also an air bag including a bag formed of such fabric. Referring now to FIG. 2, therein illustrated is such an air bag, generally designated 10. The air bag 10 is of conventional configuration and dimensions and includes as the basic components thereof a bag 10 formed of the laminated warp knit fabric 11 and an inflator 12 for producing the gases which inflate the bag 10 in the event of a collision. The bag 10 is formed by two pieces of the fabric 11 secured together by peripheral stitching, preferably using nylon or polyester thread. One of the two pieces of fabric defines a central aperture 28, which functions as an inflator opening providing communication between the inflator and the interior of bag 10. The inflator opening 28 is typically surrounded by one or more fabric reinforcing rings 30 sewn in the mouth 28 fabric. The inflator is fastened to the bag 10 in the area of the mouth 28, for example, by stitching with the exhaust outlet of the inflator being aligned with the inflator opening 28 of the bag 10. Four equidistantly spaced tethers 32 are shown, sewn at one end to the reinforcing rings 30 and at the other end to the opposed end of the bag 10, although some air bags do not require tethers. As passive passenger restraint systems involving air bags are well-known, it is not deemed necessary to set forth further details thereof herein.

As discussed briefly before, the air bag 10 employs a fabric 11 (FIGS. 3 and 4) comprised of a layer of polyurethane or other suitable film 34 laminated between layers 36 and 38 of a polyester warp knit weft inserted fabric to provide stretch and strength. Other films suitable for this use are aromatic polyetherurethanes, polyesterurethanes, polypropylene, polyamides, ethylenevinylacetate, polyester, etc.

Many types of yarn such as polyester, nylon, etc. may be used to knit the fabric. The yarn may be spun, monofilament, or multi-filament. Any reasonable yarn denier may be used. Any reasonable yarn chemical composition (manmade or natural fiber) may be used. Any reasonable type of film may be used having any reasonable thickness. Heat, pressure, and/or chemicals may be used to laminate the fabric to the film. The fabric may be laminated to both or one side of the film. More tightly knitted fabrics may be coated by kiss-coating or extrusion rather than laminated to a film. Many types of coatings may be used such as silicone, urethane, neoprene, etc.

As shown in the flow chart of FIG. 5, the laminated fabric 11 is formed generally as shown. Initially the warp knit weft inserted fabric shown schematically in FIGS. 7 or 8 is knit. Then the polyurethane film 34 in the range of 0.5 mil to 3 mil thick is supplied between two sheets 36, 38 of the warp knit fabric as shown in FIG. 6 and then the fabric sandwich is supplied into the nip of calendar roll 35, which has been preheated to a temperature of about 375° F.–390° F., and backing roll 37. Then the heated fabric is supplied to the nip of the second calendar roll 39 at the same temperature as the calender roll 35 and backing roll 37 to complete the lamination of the fabric 11. From the nip of rolls 37 and 39, the laminated fabric 11 is supplied to the take-up roll 41. After cooling, the fabric is ready to be cut to the desired size for use in the production of an air bag.

As discussed briefly before, the fabrics are preferably two-bar polyester warp knit weft inserted fabrics such as shown schematically in FIGS. 7 and 8. FIG. 7 is the preferred fabric having a 80 d tex stitch, 24 filament yarn 40 on one bar with a stitch pattern of 1-0/1-2 and a 280 d tex, 48 filament warp yarn 42 laid in on the second bar with a stitch pattern of 0-0/0-0. The weft inserted yarn 44 is a 288 d tex, 48 filament laid in at one weft per stitch. The stitch yarn 40 can be a closed stitch as shown in FIG. 7 or an open stitch knit with a stitch pattern of 0-1/2-1 as shown in FIG. 8.

As briefly indicated, the weft inserted warp knit fabric provides an air bag fabric when laminated to the film that has a more balanced stitch and increased strength for a given fabric weight. The disclosed fabric provides the desired air permeability for use in an air bag and increased seam strength when sewn.

The above-described embodiments are given for the purpose of illustration only. Improvements and modification may be made to those embodiments without departing from the scope of the invention.

I claim:

1. An inflatable air bag comprising a substantially impermeable outer fabric and an inner fabric connected thereto with an opening therein to support an inflator device, such outer fabric being a weft inserted warp knit fabric having a plastic-like layer attached thereto.

2. The outer fabric of claim 1 wherein the fabric includes two weft inserted warp knit fabrics with the layer located therebetween.

3. The outer fabric of claim 2 wherein said layer is a thermoplastic film laminated to said warp knit fabric.

4. The outer fabric of claim 3 wherein the warp knit fabric is a two bar fabric with a stitch pattern of 1-0, 1-2 on one bar and a stitch pattern of 0-0, 0-0 in the second bar.

5. The outer fabric of claim 3 warp knit fabric is a two bar fabric with a stitch pattern of 0-1, 2-1 on one bar and a stitch pattern of 0-0, 0-0 in the second bar.

6. The outer fabric of claim 4 wherein warp knit fabric is substantially 100% polyester.

7. The outer fabric of claim 6 wherein said thermoplastic film is a polyurethane.

8. The outer fabric of claim 7 wherein said film is in the range of 0.5 to 3.0 mils in thickness.

\* \* \* \* \*